US011521159B2

(12) United States Patent
McLellan et al.

(10) Patent No.: US 11,521,159 B2
(45) Date of Patent: Dec. 6, 2022

(54) SYSTEMS AND METHODS USING GEOGRAPHIC COORDINATES FOR ITEM DELIVERY

(71) Applicant: United States Postal Service, Washington, DC (US)

(72) Inventors: Charles P. McLellan, Fairfax, VA (US); Venkat Mouli, Chantilly, VA (US)

(73) Assignee: United States Postal Service, Washington, DC (US)

( * ) Notice: Subject to any disclaimer, the term of this patent is extended or adjusted under 35 U.S.C. 154(b) by 651 days.

(21) Appl. No.: 16/384,393

(22) Filed: Apr. 15, 2019

(65) Prior Publication Data

US 2019/0325388 A1 Oct. 24, 2019

Related U.S. Application Data

(60) Provisional application No. 62/660,768, filed on Apr. 20, 2018.

(51) Int. Cl.
*G06Q 10/08* (2012.01)
*H04W 4/02* (2018.01)
*H04W 4/021* (2018.01)

(52) U.S. Cl.
CPC ... *G06Q 10/08355* (2013.01); *G06Q 10/0833* (2013.01); *H04W 4/021* (2013.01); *H04W 4/027* (2013.01)

(58) Field of Classification Search
CPC ............ G06Q 10/083; G06Q 10/0832; G06Q 10/0833; G06Q 10/0835; G06Q 10/0836; G06Q 10/0837; G06Q 10/0838
See application file for complete search history.

(56) References Cited

U.S. PATENT DOCUMENTS 9,788,160 B1 10/2017 Gu et al.
2010/0332127 A1* 12/2010 Imai .................... B60W 30/12
701/532

(Continued)

FOREIGN PATENT DOCUMENTS

WO WO 2008/082628 A2 7/2008
WO WO 2017/128213 A1 8/2017

OTHER PUBLICATIONS

Reclus, Fabrice, and Kristen Drouard. "Geofencing for fleet & freight management." 2009 9th International Conference on Intelligent Transport Systems Telecommunications,(ITST). IEEE, 2009. (Year: 2009).*

(Continued)

*Primary Examiner* — Emmett K. Walsh
(74) *Attorney, Agent, or Firm* — Knobbe Martens Olson & Bear LLP

(57) ABSTRACT

A system and method for the use of geo-fences to coordinate and track delivery of items. In some embodiments, the system comprising a mobile delivery device comprising a vector calculation module configured to determine a motion vector associated with the mobile delivery device, a geo-location module configured to determine a geo-location associated with a mobile delivery device, and a geo-fence database configured to determine a size of at least one geo-fence associated with at least one location and determine whether the mobile delivery device is within the geo-fence. In some embodiments, the size of the geo-fence is determined at least in part on the motion vector determined by the vector calculation module.

18 Claims, 4 Drawing Sheets

(56) References Cited

U.S. PATENT DOCUMENTS

| 2014/0249938 | A1* | 9/2014 | Garrett .................. | G06Q 30/06 |
| | | | | 705/15 |
| 2014/0351164 | A1* | 11/2014 | Ballenger ............ | G01C 21/343 |
| | | | | 705/338 |
| 2015/0045064 | A1* | 2/2015 | Junkar .................. | H04W 4/021 |
| | | | | 455/456.3 |
| 2016/0224935 | A1* | 8/2016 | Burnett .............. | G06Q 10/0834 |
| 2017/0337511 | A1 | 11/2017 | Shroff et al. | |

OTHER PUBLICATIONS

International Search Report and Written Opinion dated Jul. 24, 2019 in International Application No. PCT/US2019/027853 filed Apr. 17, 2019.

* cited by examiner

SYSTEMS AND METHODS USING GEOGRAPHIC COORDINATES FOR ITEM DELIVERY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this Application claims the benefit of priority to U.S. Provisional Application No. 62/660,768, filed Apr. 20, 2018, the entire contents of which are incorporated by reference.

BACKGROUND

The development relates using geo-fences to coordinate and track the delivery of items. The development further relates to adjusting geo-fences based on the movement of a mobile delivery device.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with the additional specificity and detail through use of the accompanying drawings.

FIG. 4 is a flow chart depicting one embodiment of a process to determine what route for the delivery of item the mobile delivery device is current on.

DETAILED DESCRIPTION

Item delivery resources, such as item carriers or deliverers generally desire to track and coordinate the delivery of items. In some embodiments, delivery resources can carry mobile delivery devices that can be used to coordinate the delivery and track the delivery of items. In some embodiments, the mobile delivery device can accomplish this through the use of geo-fences. In some embodiments, a geo-fence is a defined area around a location. In some embodiments, entering the area defined by the geo-fence can denote that a device or person has arrived at the location. In some embodiments, the geo-fence can be defined by a set of geo-coordinates that surround the location. It can be advantageous to be notified when a carrier is approaching are approaching a delivery location and item recipients wish to be notified when an item is delivered. In some embodiments, this can be accomplished by tracking when a mobile delivery device enters geo-fences associated with a location. However, the necessary size of the geo-fence must be changed based on the speed of the delivery resource. Thus, a method and system for adjusting geo-fences can be advantageous.

In some embodiments, the mobile delivery device carried by the delivery resource can track its entrance into, dwell time within, and/or its exit from a geo-fence and then send messages or take other actions on behalf of the delivery resource. The mobile delivery device can also use its entrance into, dwell time within, and exit from geo-fences to determine if the delivery resource is on the correct route for delivering items or what route the delivery resource is currently delivering items on.

Some aspects of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

Figure 1:
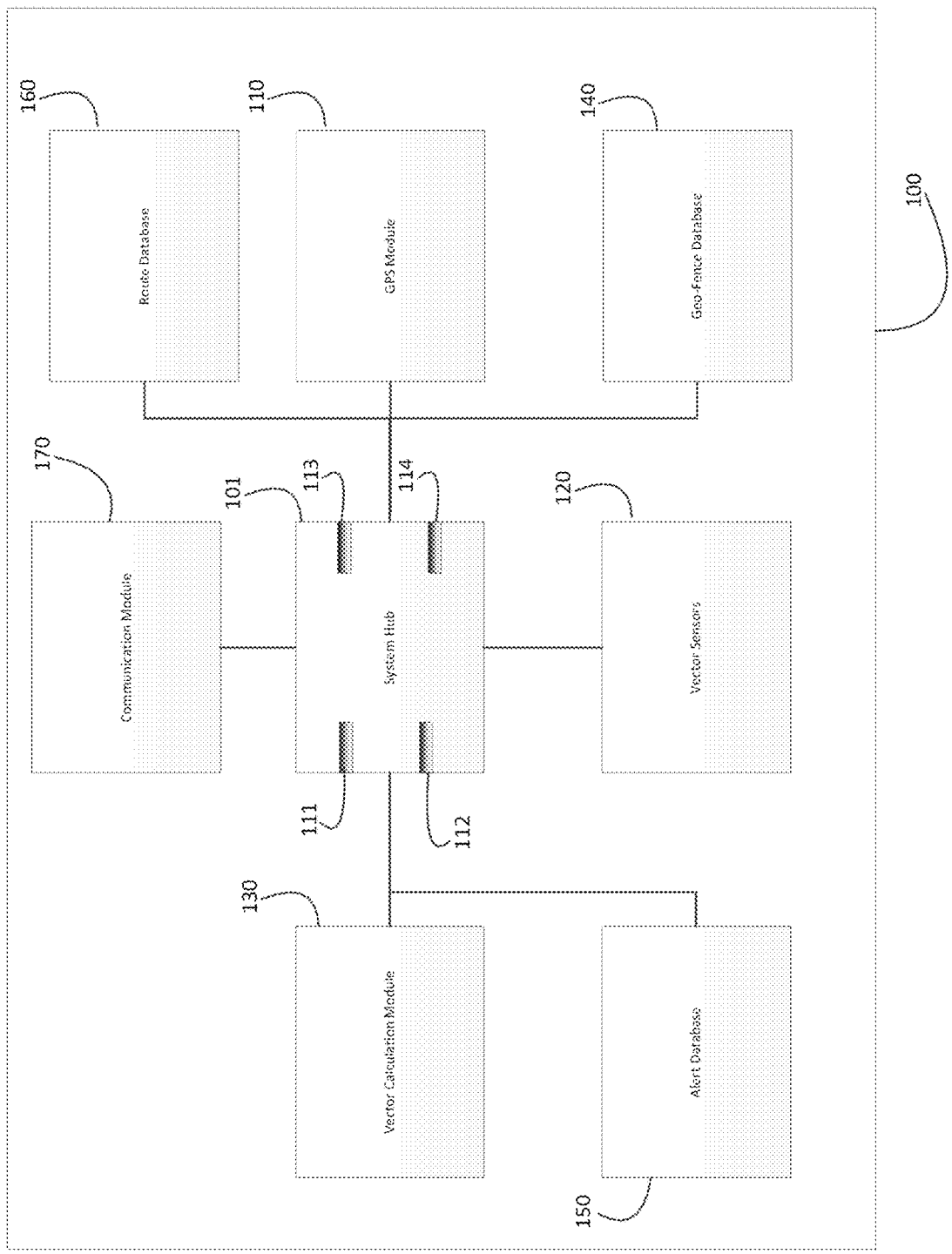
FIG. 1 is a block diagram displaying one embodiment of a mobile delivery device for using geo-fences to coordinate and track the delivery of items.

The system and method described herein relate to generating and communicating an expected delivery window. FIG. 1 depicts an embodiment of mobile delivery device 100 for using geo-fences to coordinate and track the delivery of items. The mobile delivery device 100 comprises a system hub 101, a GPS module 110, vector sensors 120, a vector calculation module 130, a geo-fence database 140, an alert database 150, a route database 160, and a communication hub 170. The system hub 101 is in communication, either wired or wirelessly, with at least GPS module 110, vector sensors 120, vector calculation module 130, geo-fence database 140, alert database 150, route database 160, and a communication hub 170.

The system hub 101 may comprise or be a component of a processing system implemented with one or more processors. The system hub 101 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 101 may comprise a processor 111 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, j5®, or i3® processor, an AMD Phenom®, A-series®, or FX® processor, or the like. The processor 111 typically has conventional address lines, conventional data lines, and one or more conventional control lines. The processor 111 may be in communication with a processor memory 112, which may include, for example, RAM memory, flash memory, ROM memory, EPROM memory, EEPROM memory, registers, hard disk, a removable disk, a CD-ROM, or any other form of storage medium known in the art. The processor memory 112 may include, for example, software, at least one software module, instructions, steps of an algorithm, or any other information. In some embodiments, the processor 111 performs processes in accordance with instructions stored in the processor memory 112. These processes may include, for example, controlling features and/or components of the expected delivery window generation system 100, and controlling access to and from, and transmitting information and data to and from the system hub 101 and the constituent components of the expected delivery window generation system 100, as will be described herein.

The system hub 101 comprises a system memory 113, configured to store information, such as confidence data, item-carrier information, expected deliveries data and the like. The system memory 113 may comprise a database, a comma delimited file, a text file, or the like. The system hub 101 is configured to coordinate and direct the activities of the components of the mobile delivery device 100, and to coordinate use, directions, notifications, and other processes associated with the distribution of items.

In some embodiments, the processor 111 is connected to a communication feature 114. The communication feature 114 is configured for wired and/or wireless communication. In some embodiments, the communication feature 114 communicates via telephone, cable, fiber-optic, or any other wired communication network. In some embodiments, the communication feature 114 may communicate via cellular networks, WLAN networks, or any other wireless network. The communication feature 114 is configured to receive instructions and to transmit and receive information among components of the mobile delivery device 100, and in some embodiments, with a central server (not shown) or other resource outside the mobile delivery device 100, as desired.

The system hub 101 is in communication with GPS module 110. In some embodiments, the GPS module 110 may comprise a processor, memory, databases, address and control lines, and other components similar to those described herein. In other embodiments, the GPS module 110 may be configured to use the processor, memory, databases, address and control lines, and other components of mobile delivery device 100.

The GPS module 110 is in communication with GPS satellites and can discover the specific location of the mobile delivery device 100 through its communications with the GPS satellites. In some embodiments, the GPS module 110 uses other position determining systems to determine the mobile delivery device 100's its exact location, such as GLONASS, COMPASS, multilateration, Wi-Fi detection, triangulation, or LORAN. In some embodiments, the GPS module 110 records the mobile delivery device 100's location periodically, such as at a defined time interval, in order to generate "breadcrumb" data. In some embodiments, the GPS module 110 records the geographic coordinates of the mobile delivery device 100 every second. In some embodiments, embodiments the communication module 170 communicates the geographic coordinates of the mobile delivery device 100 once per minute, once every other minute, once a day, at any other time interval, or continuously.

The system hub 101 is in communication with vector sensors 120. In some embodiments, vector sensors 120 can be used by the mobile delivery device to detect information that can be used to determine a direction vector for the movement of the mobile delivery device 100. In some embodiments, the direction vector comprises indications of the speed and direction of the mobile delivery device 100. In some embodiments, the vector sensors 120 can comprise accelerometers, gyroscope sensors, angular rate sensors, angular velocity sensors, or other sensors useful for detecting speed and direction.

The system hub 101 is in communication with vector calculation module 130. In some embodiments, the vector calculation module 130 may comprise a processor, memory, databases, address and control lines, and other components similar to those described herein for the system hub 101. In other embodiments, vector calculation module 130 may be configured to use the processor, memory, databases, address and control lines, and other components of the system hub 101, or a combination of its own components and the system hub 101's components. In some embodiments, vector calculation module 130 can be hosted on a server (not shown) external to mobile delivery device 100. In this embodiment, necessary information can be passed to and from the vector calculation module 130 using communication module 170.

In some embodiments, vector calculation module 130 can use the data collected from vector sensors 120 and GPS module 110 to determine a vector for the mobile delivery device 100. In some embodiments, a vector calculated by the vector calculation module 130 determines the speed and direction that the mobile delivery device 100 is moving and/or the acceleration or deceleration of the mobile delivery device 100.

In some embodiments, system hub 101 is in communication with geo-fence database 140. In some embodiments, the geo-fence database 140 may comprise a processor, memory, databases, address and control lines, and other components similar to those described herein for the system hub 101. In other embodiments, geo-fence database 140 may be configured to use the processor, memory, databases, address and control lines, and other components of the system hub 101, or a combination of its own components and the system hub 101's components. In some embodiments, geo-fence database 140 can be hosted on a server (not shown) external to mobile delivery device 100. In this embodiment, necessary information can be passed to and from the geo-fence database 140 using communication module 170.

In some embodiments, geo-fence database 140 contains information about the geo-fences surrounding various locations that the mobile delivery device 100 may visit. In some embodiments, the geo-fences surround locations, such as delivery points, collection boxes, mailboxes, porches, driveways, delivery receptacles, and the like, that the delivery resource using the mobile delivery device 100 will be delivering items to. In some embodiments, the geo-fence database 140 contains information regarding the geo-fences for all the delivery points for or along a delivery route to which a carrier and a particular mobile delivery device 100 are assigned. This information can be downloaded after a carrier signs in to the mobile delivery device and provides a route assignment, or the route may be automatically assigned based on the carrier's sign in. In some embodiments, the information is downloaded to the mobile delivery device 100 as the mobile delivery device 100 is in a charging cradle. In some embodiments, the geo-fence database 140 contains geofence information for all delivery points and collection points for a geographical area, such as a zip code or the like. The geofence information for the carrier's assigned route will be accessible, and geo-fence information for delivery points not on the assigned route, although it may be in the geo-fence database 140, may not be used. If the geo-fence data changes for delivery points, the updated geo-fence data can be pushed to the mobile delivery device 100.

In some embodiments, the geo-fence database 140 can contain information defining other areas, such as areas with hazards like dogs or open pits, or areas with roadwork, detours, or traffic slowdowns.

In some embodiments, the geo-fence database 140 can alter the size of the various geo-fences based upon information collected by the mobile delivery device 100. For example, in some embodiments, the default size of the geo-fence can be a 1, 2, 5, or 10 meter circle, square, rectangle, or other polygon around the area that it is being designated. In some embodiments, the geo-fence database 140 can alter this area to a five meter circle or twenty meter circle, or to any other desired size. In some embodiments, the geo-fence database 140 can determine and adjust or alter the size of the geo-fence based upon the speed that the mobile delivery device 100 is approaching the boundary of a geo-fence for a delivery point or collection point. In some embodiments, the database can make this determination based upon the vector calculated by the vector calculation module 130 and the location determined by the GPS module 110. For example, if the mobile delivery device 100 is approaching the geo-fence location at 3-5 miles per hour, the geo-fence could be reduced from a nominal 10 meter geo-fence to a 5 meter geo-fence surrounding the location. If the mobile delivery device 100 is approaching the geo-fence location at 5-15 miles per hour, the geo-fence could be altered to 15 meters. If the mobile delivery device 100 is approaching the geo-fence location at 15-30 miles per hour, the geo-fence could be altered to 20 meters. If the mobile delivery device 100 is approaching the geo-fence location at 30-45 miles per hour, the geo-fence could be altered to 40 meters, etc. Changing the size of the geo-fence can improve accuracy and efficiency of delivery. A delivery resource can be alerted at an appropriate time before arriving at the delivery point, for example, to allow the carrier adequate time to slow down or prepare an item for delivery to a delivery point. In some embodiments, when a carrier is travelling at a higher speed than walking, a larger geofence can alert the carrier earlier to prepare for item delivery before arriving at the actual delivery point. These sizes for geo-fences are exemplary. A person of skill in the art, guided by this disclosure, will understand that the sizes for geo-fences could be different based on particular conditions or requirements.

The system hub 101 is in communication with alert database 150. In some embodiments, the alert database 150 may comprise a processor, memory, databases, address and control lines, and other components similar to those described herein for the system hub 101. In other embodiments, alert database 150 may be configured to use the processor, memory, databases, address and control lines, and other components of the system hub 101, or a combination of its own components and the system hub 101's components. In some embodiments, alert database 150 can be hosted on a server (not shown) external to mobile delivery device 100. In this embodiment, necessary information can be passed to and from the alert database 150 using communication module 170.

In some embodiments, alert database 150 contains information on alerts that the mobile delivery device 100 can send to the delivery resource using the mobile delivery device 100. In some embodiments, mobile delivery device 100 can send these alerts to the mobile delivery device user by displaying the alert on a screen (not shown) or using a speaker (not shown) to communicate a visual or audio description of the alert. In some embodiments, the alert database 150 contains alerts that are associated with a particular location surround by a particular database. In some embodiments, these alerts can contain information such as whether an item needs to be delivered to this location or that the area has a hazards such as dogs or open pits, or that the area has roadwork, detours, or traffic slowdowns.

In some embodiments, system hub 101 is in communication with route database 160. In some embodiments, the route database 160 may comprise a processor, memory, databases, address and control lines, and other components similar to those described herein for the system hub 101. In other embodiments, route database 160 may be configured to use the processor, memory, databases, address and control lines, and other components of the system hub 101, or a combination of its own components and the system hub 101's components. In some embodiments, route database 160 can be hosted on a server (not shown) external to mobile delivery device 100. In this embodiment, necessary information can be passed to and from the route database 160 using communication module 170.

In some embodiments, route database 160 contains information regarding the route that an delivery resource is going to deliver items on. In some embodiments, a route is defined as a list of delivery points and collection points where a delivery resource is going to deliver or pick up items, and the order in which the items are going to be delivered or picked up. In some embodiments, the route database 160 can contain information on numerous routes that the delivery resource could deliver items on or that the deliverer could switch to while delivering items.

In some embodiments, communication module 170 is in communication with route database 160. In some embodiments, the communication module 170 may comprise a processor, memory, databases, address and control lines, and other components similar to those described herein for the system hub 101. In other embodiments, communication module 170 may be configured to use the processor, memory, databases, address and control lines, and other components of the system hub 101, or a combination of its own components and the system hub 101's components.

In some embodiments, the communication module 170 is configured for wired and/or wireless communication. In some embodiments, the communication module 170 communicates via telephone, cable, fiber-optic, or any other wired communication network. In some embodiments, the communication module 170 may communicate via cellular networks, WLAN networks, or any other wireless network. In some embodiments, the communication module 170 can be used by the mobile delivery device 100 to download the information stored in the alert database 150, geo-fence database 140, and route database 160 from an off-site server (not shown). In some embodiments, the communication module 170 can also be used to upload information collected by the GPS module 110, vector sensors 120, and vector calculation module 130 to an off-site server (not shown).

In some embodiments, the communication module 170 can also be used to transmit instructions to automated vehicles (not shown). For example, the communication module could send a launch command to an automated delivery drone for delivery, or command an automated truck to speed up or slow down. In some embodiments, the communication module can send these commands when the mobile delivery device 100 enters into a geo-fence.

In some embodiments, the communication module 170 can also be used to download delivery manifests associated with a particular location from a server (not shown). In some embodiments, the these manifests are downloaded and displayed by the mobile delivery device 100 when the mobile delivery device 100 enters into the geo-fence associated with the location that the manifest is for.

Figure 2:
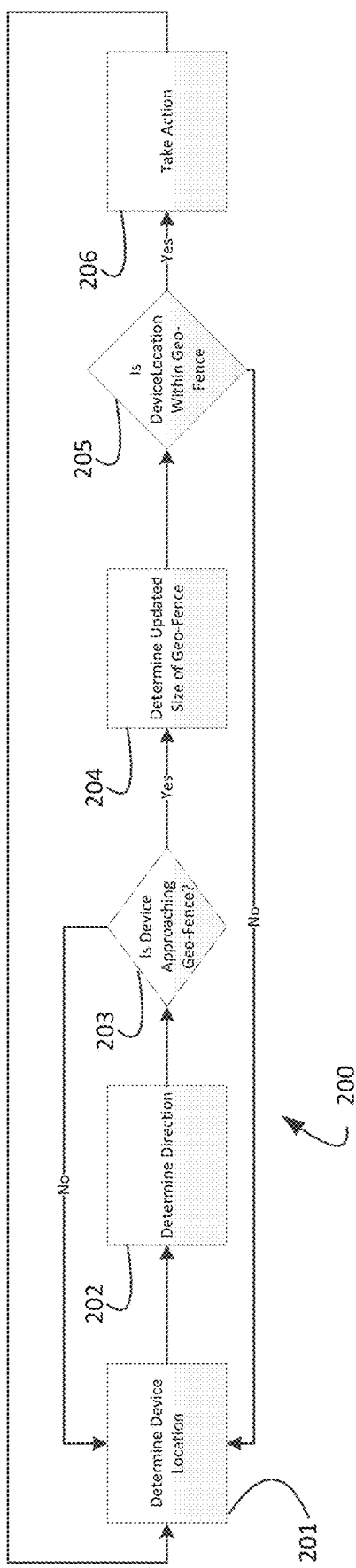
FIG. 2 is a flow chart that depicts one embodiment of a process for using the system to determine whether the mobile delivery device entered a geo-fence.

FIG. 2 is a flow chart that depicts one embodiment of a process for using the system to determine whether the mobile delivery device entered, is within, and/or has exited a geo-fence. A process 200 starts with process block 201. In process block 201, the mobile delivery device 100 determines the location of the device using the GPS module 110 to determine its location. The process then proceeds to process block 202.

In process block 202, the mobile delivery device 100 determines the motion vector of the mobile delivery device 100 (e.g., the speed and direction the mobile delivery device is moving). In some embodiments, the mobile delivery device uses the vector calculation module 130 to make this determination based on data received from the vector sensors 120 and GPS module 110. The process then proceeds to decision block 203.

In decision block 203, the mobile delivery device determines if the device is approaching a geo-fence based on the location and the motion vector of the mobile delivery device 100. In some embodiments, the mobile delivery device 100 determines this by comparing the speed, direction, and location of the mobile delivery device with geo-fences stored in the geo-fence database. For example, if the location indicates the mobile delivery device is 100 meters from a geo-fence around a delivery point, and the motion vector indicates that the mobile delivery device 100 will likely enter the geo-fence in the next minute, if the speed and direction do not change within a threshold time or predetermined time, then the system hub 101 may determine to provide an alert of an approaching geo-fence and delivery point. In some embodiments, the time from entering a geo-fence may be any desired time or interval, and may be based on any distance, direction, speed, etc., desired.

In some embodiments, the carrier's assigned route may proceed down one side of a street having a plurality of delivery points, and then proceed down the other side of the street, which also has a plurality of delivery points and associated geo-fences. The delivery points can be stored in the route database 160 and their associated geo-fences and associates can be stored in the geo-fence database. As the carrier proceeds along the first side of a street, the mobile delivery device 100, using GPS breadcrumb data and vector sensors may see that the mobile delivery device 100 is approaching a geo-fence for a delivery point on the first side of the street. Depending on how the geo-fences are set, for example, based on carrier approach speed and the like, the mobile delivery device 100 may also see that it is approaching a geo-fence around a delivery point on the other side of the street.

In this case, it may be undesirable for the mobile delivery device to determine it is approaching a geo-fence for a delivery point on the opposite side of the street from the carrier. To prevent this determination, the system hub 101, using route data stored in the route database 160 and based on breadcrumb data of where the mobile delivery device 100 has recently been, determine which portion of the route the carrier is currently delivering to. The system hub 101 will determine that the carrier is proceeding along a first segment of the route, which includes delivery points on the first side of the street. With this determination, the system hub 101 will disregard or not create alerts or adjust geo-fence sizes, or will not determine that the mobile delivery device 100 is approaching any geo-fences associated with the second portion of the route, which includes delivery points on the opposite side of the street. This can prevent the mobile delivery device 100 from alerting the carrier regarding items for delivery to delivery points on the other side of the street, or to alert regarding potential missed deliveries to delivery points which are scheduled to be visited later in the route, or warnings, or relevant route information.

If the mobile delivery device is determined not to be approaching a geo-fence, the process returns to process block 201. Otherwise, the process proceeds to process block 204.

In process block 204, the mobile delivery device 204 updates the sizes of the geo-fences that the mobile delivery device is approaching. In some embodiments, the geo-fence database 140 updates the sizes of the geo-fences based on the speed of the mobile delivery device as described elsewhere herein. The process then proceeds to decision block 205.

In decision block 205, the mobile delivery device 100 determines if the current location of the mobile delivery device is within one of the geo-fences. In some embodiments, the mobile delivery device 100 accomplishes this by using the geo-fence database 140 to compare the location of the mobile delivery device 100 determined by the GPS module 110 with the locations of the geo-fences stored in memory, or within the adjusted geo-fences calculated based on the speed of the mobile delivery device. If the mobile delivery device's location is not within the geo-fence, then the process returns to process block 201. If it is within the geo-fence, the process proceeds to process block 206.

In process block 206, the mobile delivery device 100 takes an action associated with the location that the mobile delivery device 100 just entered into. In some embodiments, the mobile delivery device 100 can display any alerts stored in the alerts database 150 associated with the particular location. In some embodiments, the mobile delivery device 100 can also use the communication module 170 to send a command to an autonomous vehicle, such as a command to speed up or slow down an autonomous vehicle, or to activate a delivery vehicle such as a drone or other similar delivery device.

In some embodiments, the action taken can be providing an alert to a carrier that there is a special item to be delivered to the delivery point associated with a geo-fence which is approaching or which the carrier has entered. The special item may require special handling or a different approach to delivery, such as requiring a receipt signature, a high-value item, an item which requires a scan by the mobile delivery device 100 upon delivery, and the like. In some embodiments, the alert may tell the carrier that there is an item, such as a parcel or a package to be delivered in addition to standard mail, flats, etc. in this way, the carrier can prepare for parcel or package delivery before reaching the delivery point.

In some embodiments, the action may be to alert the carrier that there is an item to be delivered to the delivery point the carrier is approaching. In some embodiments, the mobile delivery device 100 may alert to the type of item to be delivered, for example, a package or parcel. In some embodiments, the mobile delivery device 100 may alert the carrier that there are special handling instructions for the item to be delivered to the approaching delivery point.

In some embodiments, the action can include sending a delivery confirmation to the recipient of the item delivered. For example, when an item is delivered and the mobile delivery device leaves a geo-fence around the delivery point, or where the item was delivered, the mobile delivery device 100 can send a message directly to a recipient, or can send a message to a remote server to send a message regarding delivery. In some embodiments, the delivery confirmation can be sent as the mobile delivery device 100 enters the geo-fence or moves out of the geo-fence. In some embodiments, the delivery confirmation can be sent after the mobile delivery device 100 moves out of geo-fence surrounding a delivery point. In some embodiments, the delivery confirmation or notification can be sent after the mobile delivery device leaves a final geo-fence of a group of geo-fences around delivery points grouped together, such as a route segment or blockface. The grouping of delivery points for purposes of delivery notifications or confirmations can be done geographically, or by any other convenient criteria. In some embodiments, a street or portion of a street may be within a group of geo-fences. In this way, when a carrier has exited the final geo-fence around a delivery point on a street, the mobile delivery device can send, or instruct sending of delivery notifications or confirmations to all recipients at the delivery points in the group or route segment or blockface.

In some embodiments, the mobile delivery device 100 can determine to send delivery confirmations or notifications after it is determined that the mobile delivery device 100 has entered and subsequently exited a certain number of geo-fences. For example, in order to send the delivery confirmation or notification for delivery points along a street or a blockface, the mobile delivery device 100 will need to determine that the mobile delivery device 100 entered and subsequently exited all, or a subset of all, the geo-fences for delivery points along the street. In some embodiments, the mobile delivery device 100 may determine to send delivery notifications after it is determined to have entered and subsequently exited a threshold number of geo-fences.

In some embodiments, the mobile delivery device 100 can provide an alert to the carrier that an item delivery might be missed or that a service standard may not be met if current delivery conditions, speed, routing, workload, direction, or the like do not change. For example, in process block 203, the mobile delivery device 100 may have determined that the mobile delivery device 100 is approaching a geo-fence, but then the mobile delivery device changes speed or direction abruptly. The system hub 101 can determine that the sudden change in direction or speed, based on the GPS breadcrumb data and vector sensor data, that the mobile delivery device is no longer going to enter the geo-fence. In this case, the system hub 101 can determine or use a point of closest approach to determine the geo-fence that the mobile delivery device 100 should have entered. The system hub 101 can generate an alert to the carrier regarding the delivery point or geo-fence which the mobile delivery device approached. For example, the mobile delivery device 100 may alert the carrier that an item delivery is going to be missed based on the recorded and/or calculated deviation from the normal route. The system hub 101 may also send a notification to a supervisor or a remote server regarding the deviation, and provide the point of closest approach for a supervisor to see and potentially take action on.

In some embodiments, the mobile delivery device 100 may alert the carrier that a scheduled delivery time window may be missed based on the current pace of deliveries, the location of the mobile delivery device, the number of items to be delivered, and the like. The mobile delivery device 100 may also send an alert to a supervisor or a remote server warning that a delivery time window may be missed. The supervisor can assign, or a remote server can automatically determine if there is another carrier nearby who can deliver the item within the scheduled delivery window, and to automatically alert the other carrier to deviate from his assigned route to assist in delivery of the item. In some embodiments, the carrier can be alerted when an item delivery has been missed, such as if the carrier passes a delivery point, or enters and exits a geo-fence around a delivery point for which an item was to have been delivered. The delivery resource's mobile delivery device can be in communication with an item tracking database, such as a delivery manifest or a route manifest, such that each item for delivery along a route is identified.

The mobile delivery device 100 can communicate its position and status to a supervisor or remote server at any time, and the information can be used by the supervisor or the remote server to address any potential problems, to manage carrier and item loads, and to assess carrier performance.

Figure 3:
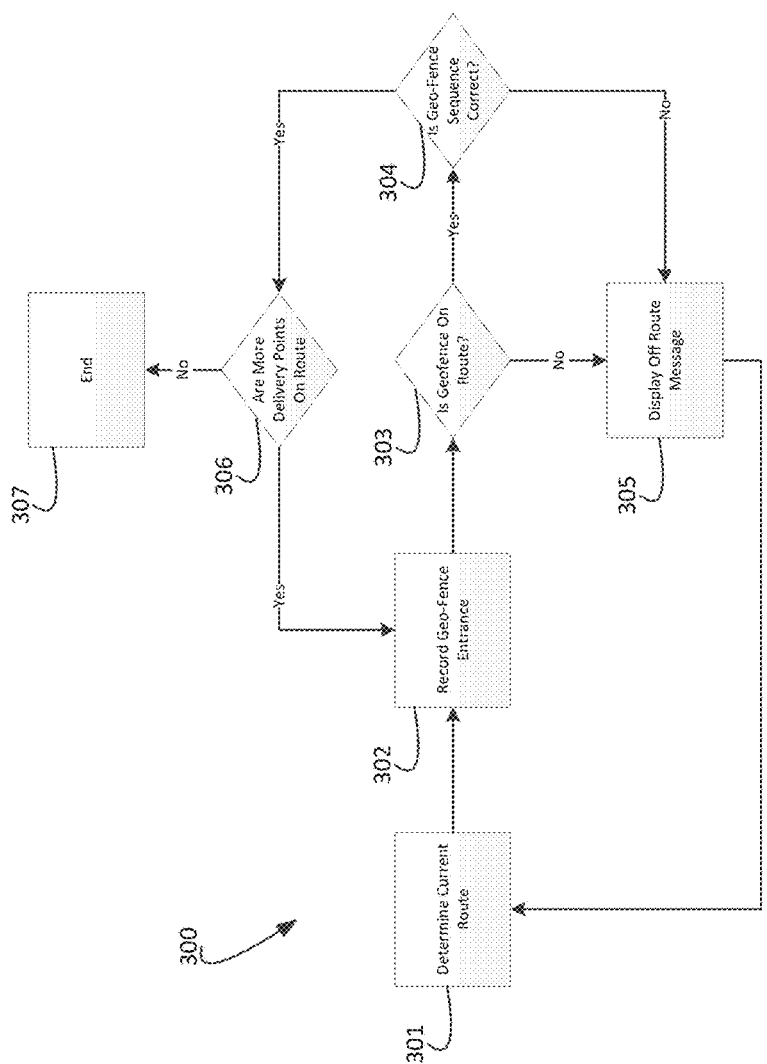
FIG. 3 is a flow chart depicting one embodiment of a process to determine if the mobile delivery device is on the correct route for delivering items.

FIG. 3 is a flow chart depicting one embodiment of a process to determine if the mobile delivery device is on the correct route for delivering items. A process 300 starts with process block 301. In process block 301, the mobile delivery device 100 determines the current route that the carrier is assigned to, or the route with which the mobile delivery device 100 will be used. In some embodiments, this information is received from a central server (not shown) through communication module 170. In other embodiments, the delivery resource using the mobile delivery device 100 can select the route through a user interface on the mobile delivery device. In some embodiments, the current route can be automatically determined by the mobile delivery device as the item carrier signs in to the mobile delivery device 100, or by using the process described with regards to FIG. 4 or some other process.

The process 300 proceeds to process block 302, wherein the mobile delivery device records that it has entered into a geo-fence. In some embodiments, the mobile delivery device determines that it has entered a geo-fence using the process described in reference to FIG. 2. The process then proceeds to decision block 303.

In decision block 303, the mobile delivery device 100 determines whether the geo-fence that the mobile delivery device 100 just recorded an entrance to is on the assigned route. In some embodiments, the mobile delivery device 100 determines whether the geo-fence entered is on the assigned by comparing the location of the geo-fence with the locations of the delivery points stored in the route database 160. If the geo-fence entered is not on the route, the process proceeds to process block 305. Information about geo-fences which are on the other side of the street, for example, can be excluded from this calculation. Otherwise the process 300 proceeds to decision block 304.

In process block 305, the mobile delivery device displays an "off route" message to the delivery resource. In some embodiments, this message is displayed to the delivery resource via a display on the mobile delivery device or is transmitted over audio through a speaker. In some embodiments, the off route message can contain information on the item deliveries that have not yet occurred on the current route. The process then returns to process block 301.

In decision block 304, the mobile delivery device 100 determines whether it is entering and/or exiting geo-fences in the correct sequence according to route information stored in the route database 160. In some embodiments, the route database 160 determines this by comparing the list of recorded entrances into the geo-fences with the ordered list of locations stored in the route database 160. In some embodiments, the route database 160 determines that the sequence is correct if the mobile delivery device is entering every geo-fence in order. In other embodiments, the route database 160 determines that the sequence is correct if every two out of three or three out of five locations have been entered into in the correct order. If the sequence is not correct, the process returns to process block 305. If the sequence is correct, the process proceeds to decision block 306.

It can be advantageous to use a two out of three, or three out of five to confirm the route, due to potential inaccuracies and variation in the geographic coordinates of delivery points. A distribution network can deliver to millions of delivery points per day, and the distribution network may not have exact geographic coordinates for each of the delivery points. Thus, the geofences around some of the geographic coordinates may not be entered and/or exited by the mobile delivery device as the delivery resource traverse the delivery route. So, it can be advantageous for the distribution network can determine that the carrier is traversing the correct route when the mobile delivery device moves through two of three or three of five geo-fences around the geographic coordinates around delivery points.

It is advantageous for the distribution network to ensure the correct routes are being serviced in order to provide accurate and correct notifications to recipients, in order to ensure that delivery windows are met. The distribution can use the correct route information for route analysis or to re-order delivery points. For example, a carrier may know the best way to traverse a route based on the on-street conditions, and this order may be different than the route in the route database 160. When the distribution network identifies the delivery points being serviced "out of order," the distribution network can analyze the route and update the delivery point sequence on the route. The distribution network can also better understand street conditions and other features of the routes based on understanding the route and evaluating how the mobile delivery devices traverse the delivery routes.

In decision block 306, the mobile delivery device determines if there are any more delivery points remaining on the route. In some embodiments, the mobile delivery device 100 determines this by comparing the mobile delivery device's most recently recorded geo-fence entrance to the last point on the route as recorded in the route database 160. If there are no more delivery points, the process ends in the process block 307. If there are more delivery points, the process returns to process block 302.

Figure 4:
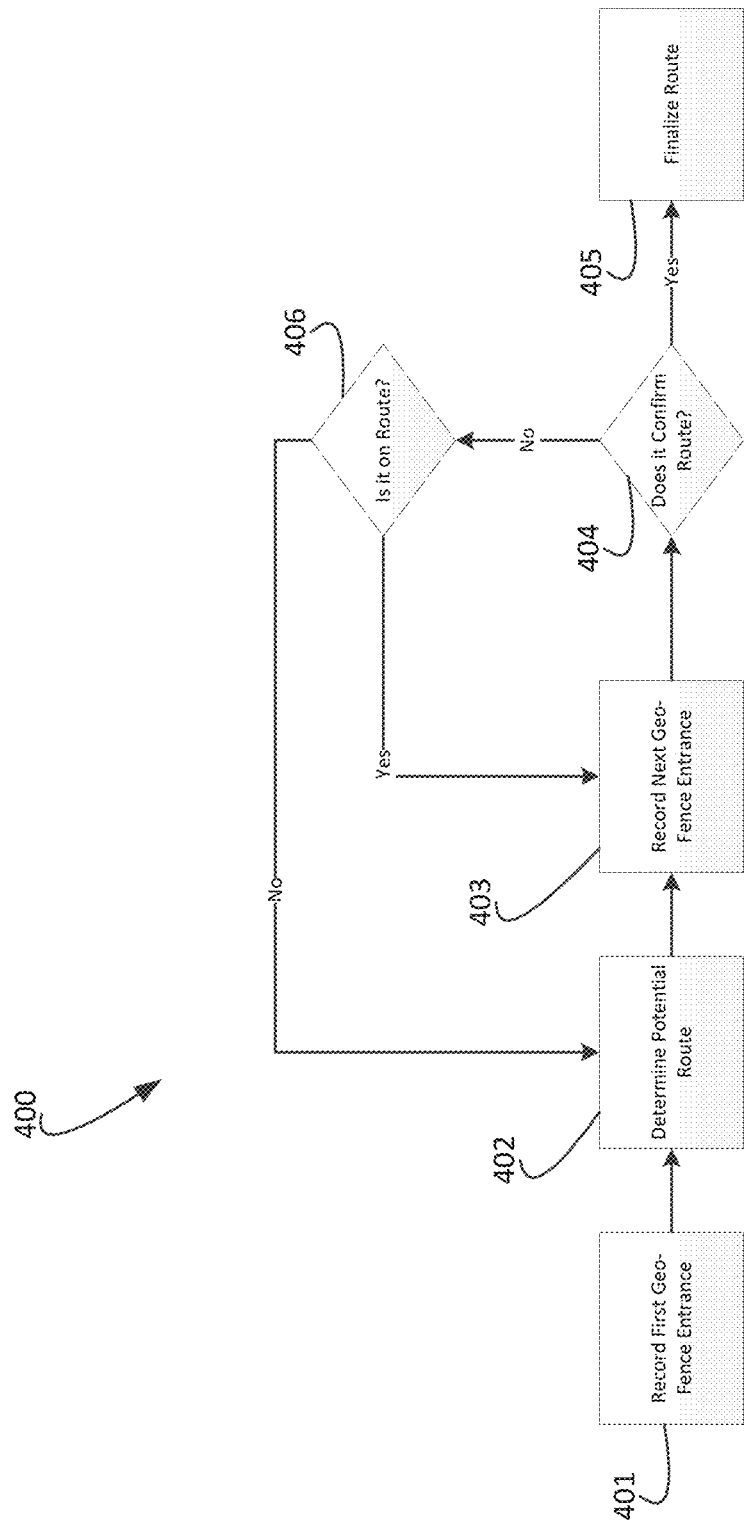

FIG. 4 is a flow chart depicting one embodiment of a process to determine which route for the delivery of an item the mobile delivery device is current on. A process 400 begins with process block 401. In process block 401, the mobile delivery device 100 records a first geo-fence entrance. In some embodiments, the mobile delivery device 100 uses the process previously described in reference to FIG. 2. The process 400 then proceeds to process block 402.

In process block 402, the mobile delivery device 100 determines a potential route based on the most recently recorded geo-fence entrance, or to determine to which regular route the delivery point associated with the recorded geo-fence entrance is assigned. In some embodiments, the mobile delivery device 100 uses can use the route database 160 to determine potential routes, or to determine the route to which the delivery point is assigned. In some embodiments, the route database 160 can determine potential routes by comparing the location associated with the geo-fence entrance and with the various locations associated with routes in the route database 160. In some embodiments, only a single potential route is identified. In other embodiments, multiple potential routes can be identified. The process then proceeds to process block 403.

In process block 403, the mobile delivery device 100 records the next geo-fence entrance. In some embodiments, the mobile delivery device 100 uses the process previously described in reference to FIG. 2. The process 400 then proceeds to decision block 404.

In decision block 404, the mobile delivery device 100 determines whether the most recently recorded geo-fence entrance confirms what route the mobile delivery device 100 is on. In some embodiments, the route database 160 determines this by comparing the list of recorded entrances into the geo-fences with the ordered list of locations stored in the route database. In some embodiments, the route database 160 determines that the sequence is correct if the mobile delivery device is entering every geo-fence in order. In other embodiments, the route database 160 determines that the sequence is correct if every two out of three or three out of five locations have been entered into in the correct order. If the most recently recorded geo-fence entrance confirms the route, the process proceeds to process block 405, where the route determination process is finalized and the mobile delivery device 100's previously determined potential route is finalized as the current route. Otherwise, the process proceeds to decision block 406.

In decision block 406, the mobile delivery device 100 determines if the location associated with the most recently recorded geo-fence entrance is on the route currently identified as the potential route. In some embodiments, the route database 160 determines whether the location associated with the most recently recorded geo-fence entrance is on the route currently identified as the potential route by comparing the location associated with the geo-fence with the list of locations on the route. If the location is on the route, the process returns to process block 403. Otherwise, the process returns to process block 402. In some embodiments, a geo-fence may be temporarily entered by the mobile delivery device, but quickly exited. Such events may not be recorded or identified as geo-fence entries, but can be determined to be transient entries, for example, based on the dwell time of the mobile delivery device within the geo-fence.

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described herein may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware. A person of skill in the art will understand that the functions and operations of the electrical, electronic, and computer components described herein can be carried out automatically according to interactions between components without the need for user interaction.

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. An item delivery system comprising:
a mobile delivery device comprising a vector calculation module configured to determine a motion vector associated with the mobile delivery device;
a GPS module configured to determine a geo-location of the mobile delivery device as the mobile delivery device traverses a delivery route;
a geo-fence database configured to store geo-fence information for a plurality of delivery points on the delivery route;
a route database, the route database storing route information for the delivery route, the route information comprising a plurality of route segments, wherein a first route segment of the plurality of route segments corresponds to a first side of a street and a second route segment of the plurality of route segments corresponds to a second side of the street;
a processor configured to:
identify, based on the motion vector and the geo-location, a plurality of geo-fences of the delivery route the mobile delivery device is approaching;
retrieve, from the GPS module, breadcrumb data for the mobile delivery device;
identify, based on the motion vector and the breadcrumb data, one of the first and second ones of the plurality of route segments the mobile delivery device is traversing; and
determine, based on the identified first or second route segment, one of the plurality of geo-fences the mobile delivery device is approaching; and
generate a notification based on the determined one of the plurality of geo-fences the mobile device is approaching.

2. The system of claim 1, wherein the geo-fence database is further configured to determine a size of the geo-fence of the one location based at least in part on the motion vector associated with the mobile delivery device.

3. The system of claim 1, wherein the mobile delivery device further comprises vector sensors configured to measure vector data and wherein the vector calculation module is further configured to determine the motion vector based at least in part on the vector data.

4. The system of claim 3, wherein the vector sensors comprise at least one of a accelerometer, gyroscope sensor, angular rate sensor, or angular velocity sensor.

5. The system of claim 1, wherein the mobile delivery device further comprises an alert database configured to store at least one alert associated with the at least one location.

6. The system of claim 1, wherein the mobile delivery device further comprises a display configured to display the at least one alert based at least in part on the determination of whether the mobile delivery device is within the geo-fence.

7. The system of claim 1, further comprising a route database configured to store route information and determine the route that the mobile delivery device is associated with.

8. The system of claim 1, wherein the motion vector comprises a direction of travel.

9. The system of claim 1, wherein the processor is configured to determine, based on the determined one of the plurality of geo-fences the mobile delivery device is approaching and the route information, that the mobile delivery device is in a geofence of one location of the plurality of locations that is on the first side of the street, and wherein the notification is related to the first route segment.

10. A method of delivering items comprising:
- determining, in a processor, a motion vector associated with a mobile delivery device;
- determining in a GPS circuit, a geo-location associated with the mobile delivery device;
- identifying, by a processor, route information for a route the mobile delivery device is traversing, route information for the route the mobile delivery device is traversing, the route information comprising a plurality of route segments, wherein a first route segments of the plurality of route segments corresponds to a first side of a street and a second route segment of the plurality of route segments corresponds to a second side of the street;
- identifying, in a processor, based on the motion vector and the geo-location, a plurality of geo-fences on the delivery route the mobile delivery device is approaching;
- retrieving, by a processor, breadcrumb data for the mobile delivery device;
- identifying, based on the motion vector and the breadcrumb data, one of the first and second ones of the plurality of route segments the mobile delivery device is traversing;
- determining, by a processor, based on the identified first or second route segment, one of the plurality of geo-fences the mobile delivery device is approaching;
- generating, by a processor, a notification based on the determined one of the plurality of geo-fences the mobile device is approaching.

11. The method of claim 10, further comprising determining size of the geo-fence of the one location based at least in part on the motion vector associated with the mobile delivery device.

12. The method of claim 10, further comprising measuring, in a vector sensor, vector data and determining the motion vector based at least in part on the vector data.

13. The method of claim 12, wherein the vector sensors comprise at least one of a accelerometer, gyroscope sensor, angular rate sensor, or angular velocity sensor.

14. The method of claim 10, further comprising providing associating an alert with the at least one location.

15. The method of claim 10, further comprising displaying, on the mobile delivery device, the at least one alert based at least in part on the determination of whether the mobile delivery device is within the geo-fence.

16. The method of claim 10, further comprising storing route information and determining the route that the mobile delivery device is associated with.

17. The method of claim 10, wherein the motion vector comprises a direction of travel.

18. The method of claim 10, wherein determining one of the plurality of geo-fences the mobile delivery device is approaching further comprises determining that the mobile delivery device is in a geo-fence of a delivery point in the first route segment.

* * * * *